United States Patent [19]
Bergman

[11] 3,871,336
[45] Mar. 18, 1975

[54] REFLECTIVE ANIMAL COLLAR AND LEASH

[75] Inventor: Samuel Bergman, Brooklyn, N.Y.

[73] Assignee: Lawrence Peska Associates, Inc., New York, N.Y.

[22] Filed: Apr. 1, 1974

[21] Appl. No.: 456,967

[52] U.S. Cl. .............................. 119/106, 119/109
[51] Int. Cl. ......................................... A01k 27/00
[58] Field of Search ............ 119/106, 109; 116/35; 350/98, 298; 40/21 C

[56] References Cited
UNITED STATES PATENTS
2,196,627  4/1940  DeSanctis ..................... 119/109 X
2,596,884  5/1952  Bailen ............................... 40/21 C
2,798,458  7/1957  Odermatt ........................... 119/106
3,276,416  10/1966  Dirks et al. ....................... 350/98 X FOREIGN PATENTS OR APPLICATIONS
425,557  5/1967  Switzerland Primary Examiner—Hugh R. Chamblee

[57] ABSTRACT

There is disclosed a collar for dogs, cats, etc. having a base strap holding a reflective material over which is placed a clear laminate. The collar may be used with a chain whose links are painted with luminescent paint of different colors.

5 Claims, 4 Drawing Figures

PATENTED MAR 18 1975　　　　　　　　　　　　　　　　3,871,336
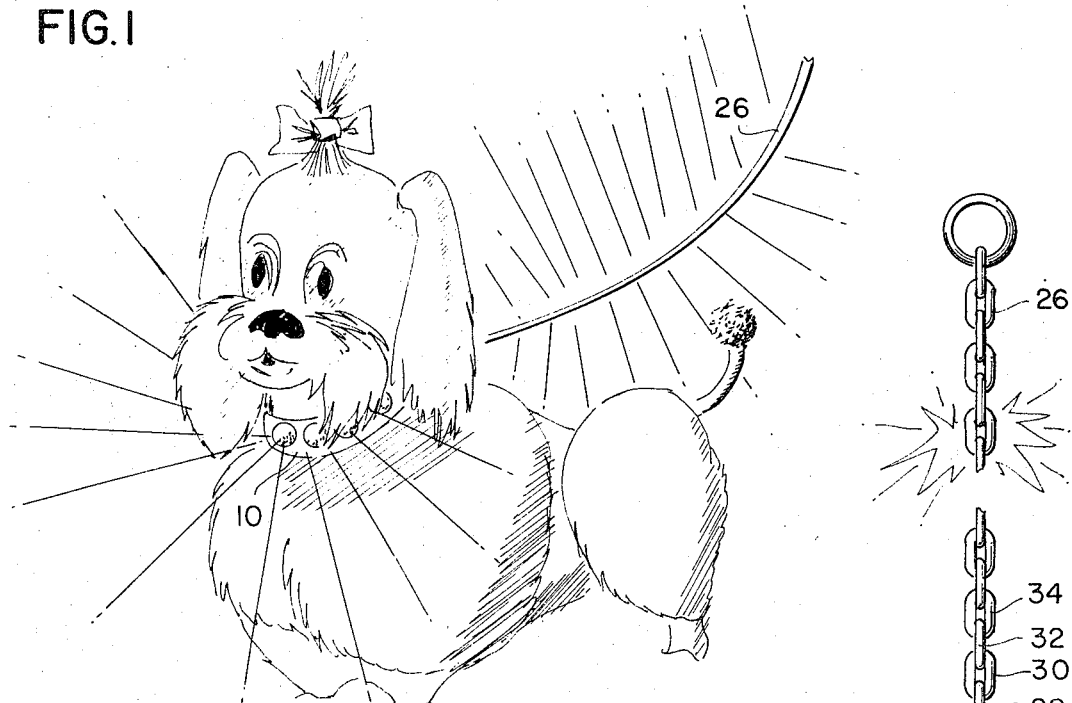
FIG.1
FIG.4
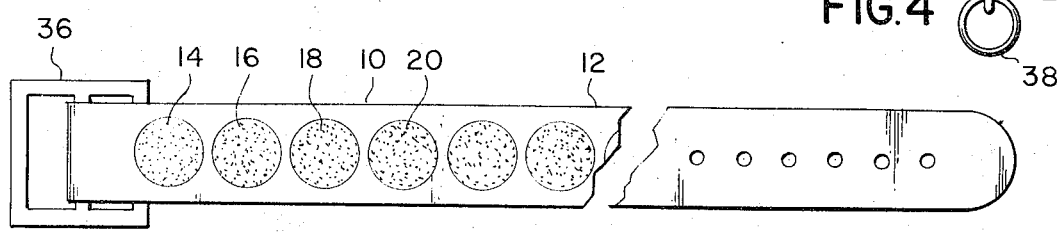
FIG.2
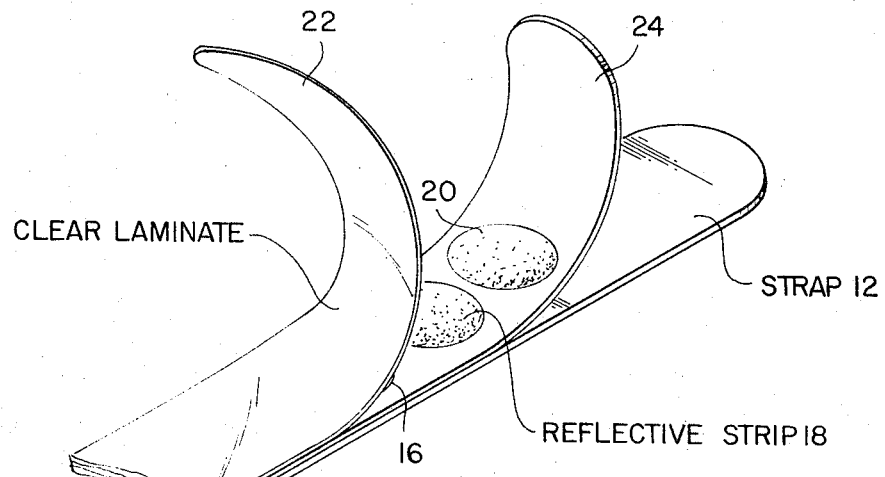
FIG.3

3,871,336

REFLECTIVE ANIMAL COLLAR AND LEASH

BACKGROUND OF THE INVENTION

1. Field of Invention

This invention is concerned with a reflective animal collar which renders the animal's presence visible upon the reflection of light thereby.

More specifically, the invention provides novel and decorative safety means for readily observing animals at a distance, in particular at night, by approaching traffic.

2. Description of the Prior Art

The prior art to which this invention relates already is aware of U.S. Pat. No. 2,721,257 which discloses a dog collar light attachment. This attachment includes a bulb, batteries and a switch for turning the light on and off. Thus its structure is more complex than required by the needs it seeks to fulfill.

The main object of this invention therefor is to provide an animal collar which is decorative, simple and inexpensive to manufacture so as to lead to widespread acceptance and use thereof.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, wherein like reference character identify the same or like parts:

FIG. 1 is a perspective view of a dog wearing a collar and leash embodying the features of this invention;

FIG. 2 is a top plan view of the collar;

FIG. 3 is an elevational view of the collar showing details of construction; and FIG. 4 is an elevational view of a chain-leash for use with the collar.

With reference to the drawing, there is shown and illustrated a collar and chain constructed in accordance with the principles of the invention and designated generally by reference character 10.

As shown in FIGS. 2 and 3, the device comprises a collar-encircling flexible, base member or strap 12 of plastic, leather or imitation leather on which are secured a plurality of shaped elements of a highly reflective material which sparkles upon being struck by light such as the material sold under the name Scotchlite. Other luminescent or chemiluminescent materials also are suitable. For best results, the preferred arrangement is to have consecutive elements of a different color. Thus in the embodiment shown, element 14 is blue, 16 is red, 18 is yellow and 20 is white and so on. It has also been found advisable, and conducive to the obtaining of better results, to make these sparkling elements in the form of a parallelogram. However, to achieve a greater decorative effect elements of other shapes can be used. Similarly, alternate elements can have different forms.

The reflective elements is glued or otherwise secured directly on base 12. Next a sheet of clear plastic laminate 22 is mounted thereon by known encapsulating techniques or other.

The reflective elements also can be deposited by known techniques on a layer of plastic support material 24 which is then bonded to base 12 when the elements of the collar are assembled together by means of suitable solvents or by a thermal process.

As an added safety and ornamental feature the hereinabove described collar can be used with the reflective chain or leash 26 shown in detail in FIG. 4. This chain is composed of a plurality of joined links, which are painted with a reflective paint. The links preferably are colored in different colors. Thus link 28 can be painted blue; 30 can be red, 32 yellow; 34 green and so on.

Releasable fastener means such as buckle 36 are provided on the collar as well as leash attaching means (not shown) for securing the end element 38 of leash 26.

The device of the invention lends itself to many modifications. Thus different color reflecting schemes can be used with different species of animals and with the males and females of the species while affording same improved visibility at a distance and in the dark.

It will thus be seen that there is provided a combinative device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention I claim as new and desire to secure by Letters Patent:

1. A reflective animal collar and leash, comprising, in combination, a collar-encircling, flexible, base member, releasable fastener means at the ends of said member; a plurality of shaped, light-reflective elements of different colors secured to said member; a clear laminate mounted over said elements and said member; a leash attached to said member and consisting of a plurality of interconnected, light-reflective links.

2. The combination of claim 1, wherein said laminate is encapsulated on said base member and elements.

3. The combination of claim 1, wherein said elements are of different shapes.

4. The combination of claim 1, wherein said links are of different colors.

5. The combination of claim 1, wherein said elements are round.

* * * * *